(12) United States Patent
Van Doorn

(10) Patent No.: US 9,297,718 B2
(45) Date of Patent: Mar. 29, 2016

(54) METHOD FOR CHECKING THE GAS TIGHTNESS OF A FUEL CELL SYSTEM

(71) Applicant: AUDI AG, Ingolstadt (DE)

(72) Inventor: Rene Van Doorn, Obersulm-Willsbach (DE)

(73) Assignee: AUDI AG, Ingolstadt (DE)

(*) Notice: Subject to any disclaimer, the term of this patent is extended or adjusted under 35 U.S.C. 154(b) by 0 days.

(21) Appl. No.: 14/386,473

(22) PCT Filed: Sep. 25, 2012

(86) PCT No.: PCT/EP2012/004008
§ 371 (c)(1),
(2) Date: Sep. 19, 2014

(87) PCT Pub. No.: WO2013/139356
PCT Pub. Date: Sep. 26, 2013

(65) Prior Publication Data
US 2015/0134277 A1 May 14, 2015

(30) Foreign Application Priority Data
Mar. 21, 2012 (DE) .......................... 10 2012 005 692

(51) Int. Cl.
*G01L 7/00* (2006.01)
*G01M 3/32* (2006.01)
(Continued)

(52) U.S. Cl.
CPC ................ *G01M 3/32* (2013.01); *G01M 3/002* (2013.01); *H01M 8/04328* (2013.01);
(Continued)

(58) Field of Classification Search
USPC .......................................................... 702/51
See application file for complete search history.

(56) References Cited

U.S. PATENT DOCUMENTS 7,127,937 B1 10/2006 Thyroff
2007/0207355 A1* 9/2007 Yoshida .......................... 429/25
(Continued)

FOREIGN PATENT DOCUMENTS

DE 10 2006 025 125 A1 12/2006
DE 11 2005 001 818 T5 5/2007
(Continued)

OTHER PUBLICATIONS

WIPO provided English translation of the International Preliminary Report on Patentability uploaded on the WIPO website on Sep. 21, 2014 for corresponding International Patent Application No. PCT/EP2012/004008.
(Continued)

*Primary Examiner* — Sujoy Kundu
*Assistant Examiner* — Paul D Lee
(74) *Attorney, Agent, or Firm* — Staas & Halsey LLP

(57) ABSTRACT

A method checks the gas tightness of a fuel cell system which has a fuel cell and a container for storing hydrogen gas. The container is connected to the fuel cell via a line along which a pressure sensor is arranged to measure a pressure of hydrogen gas flowing to the fuel cell. A quantity of hydrogen gas flowing to the fuel cell is calculated by a quantity/pressure relationship which describes a relationship between the pressure and the quantity of hydrogen gas. A current which is generated by the fuel cell is measured and a quantity of hydrogen gas which has been converted into electricity by the fuel cell is calculated by a quantity/current relationship which describes a relationship between the current generated by the fuel cell and the quantity of burnt hydrogen gas. The calculated quantities of hydrogen gas are compared with one another.

18 Claims, 1 Drawing Sheet

(51) Int. Cl.
*H01M 8/04* (2006.01)
*G01M 3/00* (2006.01)

(52) U.S. Cl.
CPC ..... *H01M 8/04388* (2013.01); *H01M 8/04582* (2013.01); *H01M 8/04589* (2013.01); *H01M 8/04671* (2013.01); *H01M 8/04992* (2013.01); *H01M 8/04335* (2013.01); *H01M 8/04373* (2013.01); *H01M 8/04395* (2013.01); *Y02E 60/50* (2013.01)

(56) References Cited

U.S. PATENT DOCUMENTS

| | | | |
|---|---|---|---|
| 2007/0224473 | A1 | 9/2007 | Suematsu et al. |
| 2008/0141760 | A1 | 6/2008 | Sienkowski et al. |
| 2009/0132183 | A1* | 5/2009 | Hartog et al. .......... 702/42 |
| 2009/0142637 | A1 | 6/2009 | Handa |
| 2009/0239105 | A1* | 9/2009 | Yoshida ............... 429/13 |
| 2009/0255326 | A1 | 10/2009 | Booden et al. |
| 2010/0086815 | A1 | 4/2010 | Manabe |
| 2010/0151343 | A1* | 6/2010 | Katano et al. .......... 429/444 |
| 2010/0233557 | A1* | 9/2010 | Maenaka et al. .......... 429/429 |

FOREIGN PATENT DOCUMENTS

| | | |
|---|---|---|
| DE | 10 2007 060 712 A1 | 10/2008 |
| DE | 10 2009 026 590 A1 | 12/2010 |
| DE | 10 2010 013 003 A1 | 9/2011 |
| DE | 10 2012 005 692.3 | 3/2012 |
| WO | WO 2010/136247 A1 | 12/2010 |
| WO | PCT/EP2012/004008 | 9/2012 |

OTHER PUBLICATIONS

Office Action issued Jul. 6, 2012 for corresponding German Patent Application No. 10 2012 005 692.3.
International Search Report mailed Dec. 19, 2012 for corresponding International Patent Application No. PCT/EP2012/004008.
Chinese Office Action dated Aug. 12, 2015 from Chinese Patent Application No. 201280040747.9, 5 pages.

* cited by examiner

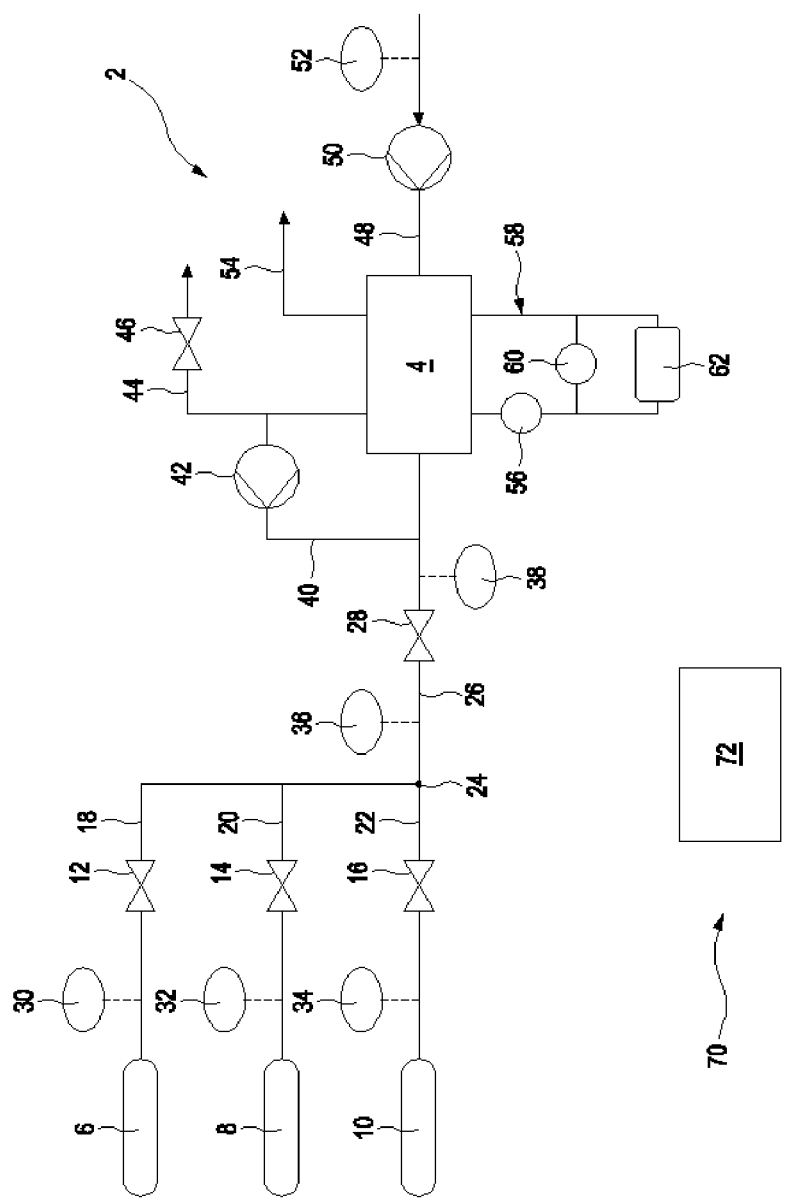

METHOD FOR CHECKING THE GAS TIGHTNESS OF A FUEL CELL SYSTEM

CROSS REFERENCE TO RELATED APPLICATIONS

This application is based on and hereby claims priority to International Application No. PCT/EP2012/004008 filed on Sep. 25, 2012 and German Application No. 10 2012 005 692.3 filed on Mar. 21, 2012, the contents of which are hereby incorporated by reference.

BACKGROUND

The invention relates to a method for checking the gas tightness of a fuel cell system. Furthermore, the invention relates to an arrangement for checking the gas tightness of a fuel cell system.

A fuel cell system which is operated with hydrogen gas ($H_2$) has one or more hydrogen tanks as well as a fuel cell. Such hydrogen tanks can be embodied, for example, as cylinders for use for a motor vehicle, in which cylinders the hydrogen is stored at a raised pressure of approximately 700 bar. If a plurality of such hydrogen tanks are arranged in the motor vehicle, the range of the motor vehicle can be correspondingly configured.

Since gaseous hydrogen is neutral in terms of smell and reacts exothermally with oxygen from the air over a wide ignition range, even in the case of low ignition energy, hydrogen sensors can be used for a fuel cell system in order to detect escaping hydrogen. Apart from costs, which are caused by the use of such hydrogen sensors, said sensors also have a considerable fault rate. Furthermore, hydrogen sensors age relatively quickly and are generally also sensitive to water vapor. A hydrogen sensor can be used only to monitor that area of the fuel cell system to which the hydrogen sensor is assigned, in which case it is also necessary to bear in mind that there are further areas in which monitoring is not carried out.

Document DE 10 2006 025 125 A1 describes a method for detecting leaking locations in a fuel cell system which comprises a hydrogen storage tank, a main shutoff valve and a secondary shutoff valve in a feed line. When switching off occurs, the main shutoff valve is closed, wherein the fuel cells are temporally left operating. Furthermore, the pressure in the feed line between the valves is measured. If the measured pressure has reached a predetermined switch-off pressure, the secondary shutoff valve is closed. At the next system start, the pressure is measured before the shutoff valves are opened, and the measured pressure is compared with the stored pressure. If a value of the present pressure measurement is lower than a value of the stored pressure measurement, this is an indication that the feed line between the shutoff valves has leaking locations. If the measured pressure is higher than the stored pressure, this is an indication that the primary valve has leaking locations.

A gas leak detecting device for a fuel cell system is known from document DE 11 2005 001 818 T5. The fuel cell system comprises here a fuel cell, a fuel gas feed source, a feed passage for the fuel gas, a discharging passage for discharging the fuel gas from the fuel cell, and an emptying valve, arranged in the discharging passage, for adapting a fuel gas quantity discharged by the fuel cell. The gas leak detecting device has a feed quantity detector, arranged in the feed passage, for detecting a fuel gas feed quantity, wherein the feed passage comprises a first passage which is arranged downstream of the feed quantity detector, wherein the fuel cell comprises a second passage through which the fuel gas flows. The discharging passage comprises a third passage which is arranged upstream of the emptying valve. Furthermore, the gas leak detecting device comprises a consumption quantity calculation device for calculating a fuel gas quantity consumed by the fuel cell, a pressure detector for detecting a pressure of the fuel gas in a leak detecting passage including the three passages, a change quantity calculation device for determining a change in the pressure and for calculating a change in the fuel gas quantity in the gas leak detecting passage owing to the change in the pressure of the fuel gas and a differential quantity calculation device for calculating a difference between the detected quantity of fed-in fuel gas and the total quantity of the consumed fuel gas as well as the change in the fuel gas quantity in the gas leak detecting passage.

A diagnostic method for detecting component faults in a fuel cell anode subsystem is known from document DE 10 2007 060 172 A1. In this context, a fuel flow is estimated by injectors and compared with a model which is based on system parameters. An observer-based model is used to determine a residual value of the difference between the hydrogen supply and the consumed hydrogen, wherein the residual value is compared with a limiting value range.

SUMMARY

Against this background one potential goal is to eliminate hydrogen sensors from a fuel cell system without, however, reducing the safety of the fuel cell system.

The inventor proposed a method for checking the gas tightness of a fuel cell system which has a fuel cell and at least one container for storing hydrogen gas. The at least one container is connected to the fuel cell via a line along which at least one pressure sensor is arranged. In order to carry out the method, a pressure of the hydrogen gas flowing to the anode of the fuel cell in this line is measured with the at least one pressure sensor and the quantity of hydrogen gas upstream of the fuel cell and/or of the quantity of gaseous hydrogen flowing to the fuel cell are/is calculated by a quantity/pressure relationship. Furthermore, an electric current which is generated by the fuel cell and/or flows through the fuel cell is measured and a quantity of the hydrogen gas which has been converted into electricity and/or burnt by the fuel cell is calculated therefrom by a quantity/current relationship. The quantities of hydrogen gas which are calculated here are compared with one another. The quantity, usually number of particles, of the hydrogen gas flowing to the fuel cell is therefore compared with the quantity, usually number of particles, of hydrogen gas burnt by the fuel cell.

In this context it is provided that the quantity/pressure relationship describes a usually mathematical and/or functional relationship between the pressure and the quantity of the flowing hydrogen gas. The quantity/current relationship describes a usually mathematical and/or functional relationship between the current generated by the fuel cell and the quantity of the hydrogen gas which has been converted into electricity as a result of combustion in the fuel cell.

Usually, as a result of generation of the current in the fuel cell hydrogen is burnt which can also be described by stating that the hydrogen gas but also the gaseous oxygen, which react with one another in the fuel cell, are converted into electricity since electrical energy and therefore current is generated in a reaction of the hydrogen gas with the gaseous oxygen.

The equation for the ideal gas or a Virial equation for hydrogen gas can be used as the quantity/pressure relationship. It is also possible to use a characteristic curve for the quantity/pressure relationship, wherein such a characteristic curve describes the equation for the ideal gas or the Virial equation for hydrogen gas of the fuel cell system. This characteristic curve can be measured and/or calculated at least point by point.

The equation of the Faraday law and/or a characteristic curve can be used for the quantity/current relationship. In this context, this characteristic curve can also describe the Faraday law and be adapted to the fuel cell system whose gas tightness has to be checked. This characteristic curve can also be measured and/or calculated at least point by point.

The quantity and therefore a number of particles as well as mass of the hydrogen can be determined in two different ways with the relationships used, i.e. with the quantity/pressure relationship and the quantity/current relationship with which a dependence of the quantity of the gaseous hydrogen on the pressure or current is described.

For the equation of the ideal gas, the following applies as a possible quantity/pressure relationship:

$$P*V=m*R*T.$$

Here, p is the pressure of the hydrogen gas in the line, V is the volume taken up by the gas and R is the gas constant, wherein the universal gas constant $R_n = 8.314462$ Jmol$^{-1}$K$^{-1}$ or the specific gas constant $R_s$ for hydrogen can be used. After the equation of the ideal gas is solved, the following is obtained for the pressure-dependent quantity:

$$m=(p*V)/(R*T).$$

Alternatively or additionally, a Virial equation of the hydrogen gas can also be used to represent the quantity/pressure relationship which can usually be a series expansion of a general gas equation and therefore, for example, also a series expansion of the equation for the ideal gas. Such a Virial equation is described, for example, in the article "Standardized Equation for Hydrogen Gas Densities for Fuel Consumption Applications" by Eric W. Lemmon et al., and is as follows:

$$m = MV$$
$$= MV/R.$$

Here, M is the molar mass, ρ is the molar density, which is dependent on the pressure and the temperature, and k is a factor for the compressibility, which is also dependent on the pressure and the temperature. In this context, $\rho_E$, $p_E$ and $T_E$ are those variables which are measured at the end of an observed time interval, and $\rho_A$, $p_A$ and $T_A$ are those variables which are measured at the start of this time interval. The factor k for the compressibility represents a deviation from the ideal case in the Virial equation for the quantity of hydrogen presented above.

According to the Faraday law, the following applies to the quantity of gas which is deposited in the fuel cell as a possible quantity/current relationship:

$$m=t_B*I/(z*F).$$

Here, $t_B$ is the observation time, for example the length of the specified time interval, I is the current, z is a value of the hydrogen gas and F=96485.3365 C mol$^{-1}$ is the Faraday constant.

All the variables to be used, i.e. for the pressure p, the volume V, the temperature T, the factor k for the compressibility and ρ for the molar density are usually measured at at least one specific time and assumed to be constant. In a refinement of the method it is possible to detect and/or use the specified variables, i.e. the pressure p(t), the volume V(t), the temperature T(t), the factor k(t) for the compressibility and ρ(t) for the molar density as time-dependent variables, as a result of which it is possible to take into account dynamics in the fuel cell system. For this purpose, the specified variables are measured at least twice, as a rule at a time at the start and at a time at the end of the time interval. It is also possible to measure a time profile of these variables during the time interval.

The quantity of hydrogen gas is therefore determined both in a pressure-dependent manner and a current-dependent manner. If a characteristic curve is used for at least one dependence of the hydrogen gas, i.e. for the quantity/pressure relationship and/or the quantity/current relationship, such a characteristic curve can be based on one of the equations described above and can be stored as an assignment of the quantity of the hydrogen gas to the pressure and/or the current in a memory of the control device for implementing the proposed method. At least one such characteristic curve can be determined individually for a fuel cell system for which the method is to be carried out, by measuring and/or calculating, and, if appropriate, adapted during operation by repeated measurement and/or calculation. Calculations can be carried out taking into account one of the specified equations.

It is to be assumed that there is a leak if the calculated quantity of the hydrogen gas flowing to the fuel cell is greater than, usually significantly greater than, the quantity of hydrogen gas which has been converted into electricity by the fuel cell and determined by calculation. If the two quantities are of the same magnitude, this is an indication that the fuel cell system is gas-tight.

In the method, in each case a plurality of time-dependent values can be summed for the measured pressure and the measured current, said time-dependent values occurring, for example, at a plurality of times over the time interval, and can be used to calculate the quantities to be compared. It is possible here to integrate the current I over the observation time $t_B$ as a duration of the time interval, wherein the total charge Q which has flowed and also the quantity m of the hydrogen gas can be calculated therefrom.

In one refinement, the method for a fuel cell system which has a plurality of containers for storing hydrogen can be carried out, wherein all the containers are connected to the fuel cell via a common line. The at least one pressure sensor, is arranged with which pressure sensor the pressure which is necessary to calculate the quantity of hydrogen which flows to the fuel cell is measured, is at this line which is common to all the containers. In order to check the gas tightness, only one of the containers is opened, whereas all the other containers are closed. A volume which is to be taken into account for the flowing gas is therefore reduced, as a result of which accuracy for the pressure to be measured can be increased.

In addition, a quantity of air and therefore oxygen which flows to the cathode of the fuel cell can also be determined and compared with at least one of the specific quantities of hydrogen. The quantity of air can be measured. It is also possible for a pressure of the air to be measured and the quantity of the air and/or of the oxygen which flows to the fuel cell to be calculated therefrom by a quantity/pressure relationship for the oxygen in the air, for example the equation for the ideal gas or a characteristic curve. The quantity of air or oxygen is compared with the quantity of hydrogen determined by the pressure and/or with the quantity of hydrogen determined by the current. If only the quantity of air can be determined by the pressure and/or the characteristic diagram, the quantity of oxygen can be determined as, for example, pressure-dependent and/or temperature-dependent percentage component of the air air by an additional characteristic diagram.

Furthermore, a temperature of the at least one container can be measured and a throughput rate of hydrogen gas for the at least one container can be determined by the Joule-Thomson effect. In this context, a profile of the temperature of the hydrogen gas in the remaining containers whose valve is respectively closed is to be taken into account. The temperature of the hydrogen in the at least one container can be compared with a temperature of the air in the surroundings and therefore with an external temperature.

The Joule-Thomson effect used here describes a change in temperature of a gas, i.e. of the hydrogen gas but also of the oxygen in the air, when there is a change in pressure in a container as a result of throttling, wherein a volume of the gas is increased, allowing gas to relax and reducing its pressure. A Joule-Thomson coefficient $\mu_{JT} = \Delta T / \Delta p$ which is used here describes the pressure-dependent change in temperature $\Delta T$. As a result, in the case of a constant volume the quantity m of the hydrogen gas can also be calculated and likewise used as a quantity/pressure relationship. In addition, given a constant volume V an associated measured change in pressure $\Delta p$ can be determined and compared with the change in pressure $\Delta p$ from the Joule-Thomson coefficient $\mu_{JT}$.

Furthermore, temperatures of hydrogen gas in a plurality of non-active containers can be compared with one another. If the temperature of the hydrogen gas in a non-active, closed container differs from one of the other measured temperatures, i.e. the hydrogen gas in another container and/or of the air outside, this is an indication of the presence of a leak in the corresponding container.

The inventor also proposes a system that has at least one control device arrangement and is designed to check the gas tightness of a fuel cell system which has a fuel cell and at least one container for storing hydrogen gas, wherein the at least one container is connected to the fuel cell via a line along which at least one pressure sensor is arranged. At least one pressure sensor measures a pressure of the hydrogen gas flowing to the fuel cell in this line, wherein the control device arrangement calculates the quantity of the hydrogen gas upstream of the fuel cell on the basis of the measured pressure by a quantity/pressure relationship of the gas, for example with the equation for the ideal gas, the Virial equation and/or a characteristic curve for representing the quantity/pressure relationship. A current measuring device measures a current generated by the fuel cell, wherein the control device arrangement calculates a quantity of the hydrogen gas converted into electricity by the fuel cell on the basis of the measured current by a quantity/current relationship, for example with the equation of the Faraday law or by a characteristic curve. Furthermore, the control device arrangement compares the calculated quantities with one another.

The arrangement can also have the at least one pressure sensor and/or the current measuring device and is designed to carry out at least part of the proposed the method. A measurement of the current can, for example, alternatively be determined with a digital voltage measurement by a shunt or shunt resistor as a possible embodiment of a current measuring device.

Of course, the features which are mentioned above and are still to be explained below can be used not only in the respectively specified combination but also in other combinations or alone without departing from the scope of the proposals.

BRIEF DESCRIPTION OF THE DRAWINGS

These and other objects and advantages of the present invention will become more apparent and more readily appreciated from the following description of the preferred embodiments, taken in conjunction with the accompanying drawing of which:

FIG. 1 shows a schematic illustration of an example of a fuel cell system with an embodiment of the arrangement designed to carry out the proposed method for checking the gas tightness of the fuel cell system.

DETAILED DESCRIPTION OF THE PREFERRED EMBODIMENT

Reference will now be made in detail to the preferred embodiments of the present invention, examples of which are illustrated in the accompanying drawing, wherein like reference numerals refer to like elements throughout.

The fuel cell system 2 illustrated schematically in FIG. 1 comprises a fuel cell 4 as well as a plurality of containers 6, 8, 10, embodied here as cylinders, for storing gaseous hydrogen or hydrogen gas which is provided for conversion to electricity in the fuel cell 4, wherein hydrogen gas reacts with oxygen and current is generated. In this context, each of these containers 6, 8, 10 is assigned a valve 12, 14, 16 with which a respective container 6, 8, 10 can be opened and closed. Furthermore, each valve 12, 14, 16 which is assigned to a container 6, 8, 10 is connected to a container-specific line 18, 20, 22, wherein these container-specific lines 18, 20, 22 open, at a common interface 24, into a line 26 which is common to all the containers 6, 8, 10. This common line 26 is connected in turn to the fuel cell 4, wherein in the example of the fuel cell system 2 illustrated here a common valve 28 which is configured as a pressure control valve is arranged along the common line 26.

Furthermore, each container 6, 8, 10 is assigned a container-specific temperature sensor 30, 32, 34 for determining the temperature of the hydrogen in, in each case, one container 6, 8, 10. A pressure sensor 36, embodied as a high pressure sensor, for measuring a pressure of the gaseous hydrogen in a first section of the common line 26 is arranged along the first section of the common line 26 between the common interface 24 and the common valve 28. In a second section of the line 26 which is common to all the containers 6, 8, 10, which section is arranged between the common valve 28 and an anode side of the fuel cell 4, a pressure sensor 38, which is embodied as a low pressure sensor, is arranged here, with which pressure sensor 38 a pressure of the gas within the second section of the common line 26 can be measured.

FIG. 1 also shows that the fuel cell 4 is connected on the anode side to the second section of the common line 26 by a return line 40. A delivery unit 42, embodied, for example, as a pump, is arranged along this return line 40, with the result that the return line 40 forms, with the delivery unit 42, a feedback loop (recycling loop) for gaseous hydrogen from the fuel cell 4 to the common line 26. Furthermore, the fuel cell 4 is connected on the anode side to an exhaust gas line 44 along which a purge valve 46 is arranged, via which purge valve 46 excess gaseous hydrogen can be discharged from the fuel cell 4 into the surroundings.

Furthermore, the fuel cell 4 is connected on the cathode side to an air line 48 along which a further delivery unit, embodied, for example, as a pump 50, is arranged, wherein air, which is sucked in from the surroundings with the delivery unit 50, is fed to the fuel cell 4 on the cathode side via the air line 48. At least one state variable of the air from the surroundings is measured with an air sensor 52 which is assigned to the air line 48.

During operation of the fuel cell 4, the gaseous hydrogen from the containers 6, 8, 10 reacts with the oxygen as a component of the air of the surroundings to form water discharged from the fuel cell 4 via a water line 54. Chemical energy, which is produced during a reaction of the hydrogen with the oxygen, is converted into electrical energy in the fuel cell 4.

A current which is generated here is measured with a current measuring device which is embodied, for example, as an ammeter 56 and is arranged inside a circuit 58 which is embodied as a medium voltage network which is connected to the fuel cell 4. Furthermore, the circuit 58 has a voltage measuring device 60 which is connected parallel to the fuel cell 4 and with which a voltage and/or voltage situation present at the fuel cell 4 is measured. Furthermore, the fuel cell 4 is connected to at least one consumer 62 (EMS) via the circuit 58.

The embodiment of the arrangement 70 which is also illustrated schematically in FIG. 1 comprises a control device arrangement 72 which in turn comprises at least one control device. There is provision here that the control device arrangement 72 is connected to all the presented components of the described fuel cell system 2. The lines provided for this for exchanging signals between the control device arrangement 72 and the components of the fuel cell system 2 are not illustrated in FIG. 1 for the sake of better clarity.

There is provision that signals relating to state variables, i.e. temperature as well as pressure of the gaseous hydrogen, are made available to the control device arrangement 72 via components of the fuel cell system 2 which are embodied as sensors, i.e. by the temperature sensors 30, 32, 34 and the pressure sensors 36, 38. A signal relating to at least one state variable of the air of the surroundings is made available to the control device arrangement 72 via the sensor which is embodied as an air sensor 52. Signals relating to electrical operating parameters, i.e. the current and the voltage of the fuel cell 4, are made available to the control device arrangement 72 by the two electrical sensors, i.e. the current measuring device 56 and the voltage measuring device 60. The control device arrangement 72 is informed about an operating state of the fuel cell system 2 by the sensor signals which are made available.

Furthermore, the control device arrangement 72 is designed to check functions of actuators of the fuel cell system 2 and therefore control them in an open-loop and/or closed-loop fashion. For this purpose, signals are made available to these actuators by the control device arrangement 72. In this context, the control device arrangement 72 makes signals available to the actuators which are embodied as valves 12, 14, 16, 28, 46. The specified valves 12, 14, 16, 28, 46 can therefore usually be opened and/or held open by energization, which is made available by the control device arrangement 72. Gaseous hydrogen can flow via opened valves 12, 14, 16, 28, 46. If the valves 12, 14, 16, 28, 46 are not energized by the control device arrangement 72, they are closed. Furthermore, the actuators of the fuel cell system 2 which are embodied as delivery units 42, 50 are activated by the control device arrangement 72, with the result that a quantity of a fluid to be delivered by these delivery units 42, 50, i.e. gaseous hydrogen and/or air, is monitored.

A customary operation of the fuel cell system 2 can be monitored with the control device arrangement 72. The control device arrangement 72 is designed, independently of the latter, to monitor, and therefore carry out, at least part of the proposed method. The described control device arrangement 72 can comprise at least one control unit and therefore, if appropriate, also a plurality of control units which are, however, connected to one another and, if appropriate, monitored by a superordinate control unit.

Depending on the definition, at least one of the components of the fuel cell system 2 relating to the proposed method can also be embodied as a component of the arrangement 70. This relates to the sensors and to the actuators of the fuel cell system. Accordingly, it is possible that at least one sensor, i.e. a temperature sensor 30, 32, 34, a pressure sensor 36 and/or an electrical sensor, i.e. the current measuring device 56 and/or voltage measuring device 60, can be embodied as a respective component of the arrangement 70. Furthermore, it is possible that at least one actuator, i.e. at least one valve 12, 14, 16, 28, 46 and/or at least one delivery unit 42, 50, can be embodied as a possible component of the arrangement 70.

Gaseous hydrogen which flows from at least one of the containers 6, 8, 10 into the first section of the common line 26 via a container-specific line 18, 20, 22 and has an increased pressure of, for example, 700 bar, wherein a pressure of the hydrogen in the first section of the common line 26 can be determined precisely by the pressure sensor 36 embodied as a high pressure sensor, is relaxed from the high pressure, also referred to as supply pressure, to a relatively low pressure by the common valve 28, with the result that the gaseous hydrogen in the second section of the common line 26 which is connected to the fuel cell 4 on the anode side has a relatively low pressure which is suitable for carrying out the reaction in the fuel cell 4. This relatively low pressure in the second section of the common line 26 is typically 2 to 10 bar and can be determined by the pressure sensor 38 which is shown in FIG. 1 and embodied as a low pressure sensor, or alternatively by a differential pressure sensor (not shown further).

Gaseous hydrogen at a relatively low pressure is fed to the fuel cell 4 on the anode side, said fuel cell 4 usually being operated with a hydrogen surplus. Small quantities of unused and/or excess hydrogen on the anode side of the fuel cell 4 can be discharged via the return line 40 and/or the exhaust gas line 44 periodically and/or as required.

The quantity, temperature and/or pressure of the air sucked in from the surroundings on the cathode side via the delivery unit 50 are determined by the air sensor 52. Furthermore, the air is compressed with the delivery unit 50. The oxygen from the air reacts in the fuel cell 4 with the gaseous hydrogen, wherein current is generated which is measured by the current measuring device 56 and consumed by the at least one consumer 62, which can also be referred to as a main consumer. The at least one consumer 62 and therefore also a plurality of consumers 62 in the circuit 58 which is embodied as a medium voltage network determines or determine the electrical variable, i.e. a voltage U and a current I also by sensor and transmit signals about this to the control device arrangement 72 via the lines (not illustrated) which can be embodied as part of a network, embodied as a CAN (Controlled Area Network).

In the described embodiment, in each case only one of the valves 12, 14, 16 is opened in order to supply the fuel cell 4 with hydrogen which is stored in a plurality of containers 6, 8, 10. If this one valve 12, 14, 16 is opened, all the other valves 12, 14, 16 are closed. The opened valve 12, 14, 16 is closed again if the at least one state variable of the hydrogen in the common line 26, determined by at least one common gas sensor, for example a pressure sensor 36, differs from a setpoint value by a tolerance value. Alternatively or additionally, the opened valve 12, 14, 16 can also be closed again if a temperature which is measured by a container-specific temperature sensor 30, 32, 34, as a state variable of the gaseous hydrogen in the respective container 6, 8, 10, differs from a setpoint value by a tolerance value.

This procedure can be carried out during continuous operation of the fuel cell system and/or during checking of the gas tightness of the fuel cell system 2. Furthermore, a sequence can be defined for the containers 6, 8, 10, wherein the valves 12, 14, 16 assigned to the containers 6, 8, 10 can be opened successively as necessary in accordance with the sequence. The setpoint value of the at least one state variable, i.e. a container-specific temperature and/or of the pressure in the measured line 26 can be adapted situationally and/or permanently predefined. The tolerance value of the at least one state variable can also be adapted situationally and/or permanently predefined.

A pressure, a quantity and/or a temperature of the gaseous hydrogen in the common line 26 can be measured as at least one state variable.

This measure makes it possible in turn always to energize and therefore open just one container-specific valve 12, 14, 16. Since in each case just one container 6, 8, 10 is therefore opened and hydrogen is therefore emptied from just one of the containers 6, 8, 10 with a comparatively low volume, the pressure measured with the pressure sensor 36 embodied as a high pressure sensor drops more quickly than if all the valves 12, 14, 16 were opened simultaneously, and a comparatively large volume is therefore emptied. The pressure can therefore be determined more precisely by the pressure sensor 36 embodied as a high pressure sensor in the common line 26. As a result, it is also possible to determine the consumption of hydrogen by the fuel cell 4 more precisely.

In order to determine the consumption of hydrogen by the fuel cell 4, the quantity of hydrogen is determined by the fuel cell 4 by a quantity/pressure relationship which describes a mathematical and/or thermodynamic relationship between the quantity of hydrogen gas and the pressure thereof. If the equation for the ideal gas is used here, given a known pressure and known temperature a quantity of hydrogen is determined. The same is also possible by using a Virial equation of the hydrogen gas and/or a characteristic curve for the quantity/pressure relationship.

Furthermore, the quantity of hydrogen which is burnt and therefore converted into electricity can also be determined by the current equivalence which is described by the quantity/current relationship, for example a characteristic diagram and/or the Faraday law $m=I/F$, where I is the current usually measured by the current measuring device 56 and F is the Faraday constant $F=96485.3365$ C/mol.

By comparing the consumption which is determined by the pressure, measured by the at least one pressure sensor 36 in the common line 26, and the consumption which is determined with the current equivalence, for example by the Faraday law, it is possible to obtain information about whether the fuel cell system 2 has a leak.

In one refinement it is possible to determine the consumed quantities by summing over time the state variables of the pressure and current. Alternatively or additionally, smoothed measurement signals of these state variables can also be used, this relates to measurement signals of at least one pressure sensor 36 and/or of the current measuring device 56, coupled to smoothing of the measurement signals. Such information about the consumed quantities is not possible when all the valves 12, 14, 16 are opened simultaneously and there is a resulting enlarged volume for the hydrogen, as a result of which the pressure, for example the high pressure in the first section of the common line 26, changes only very slowly.

In a further refinement it is to be borne in mind that a deviation of a pressure-dependent quantity and of a current-dependent quantity of hydrogen can result not only from a leak but also from drifting of one of the sensors used. For this reason, internal comparisons and/or validations of measurement signals can also be carried out, which provides indications about faults of sensors and/or measured value generators.

It is therefore possible additionally to determine a decrease in a temperature measured by a temperature sensor 30, 32, 24, which is described by the Joule-Thomson effect, of an active and therefore opened container 6, 8, 10 as a function of time. Here, a smaller quantity of hydrogen is extracted from a container 6, 8, 10 than is the case at the same time given a plurality of simultaneously opened containers 6, 8, 10, since the Joule-Thomson effect is dependent on throughput and can be determined relatively precisely when there is only one opened container 6, 8, 10. The Joule-Thomson effect can be measured better when only one container 6, 8, 10 is opened than when a plurality of containers are opened. In order to eliminate effects of an ambient temperature, for this purpose the temperature and/or pressure of the air measured by the gas sensor 52 from the surroundings can also be included straightaway in a comparison, wherein effects which are dependent on the ambient temperature can be eliminated. Alternatively it is also possible to measure the ambient temperature with another temperature sensor (not shown here). Furthermore, a temperature profile of the non-active containers 6, 8, 10 can also be included, wherein a profile of the temperature of at least one of the non-active containers 6, 8, 10 should follow a long term trend of the temperature of the air in the surroundings. If the temperature of one of the non-active containers 6, 8, 10 should differ here from the temperature of the air of the surroundings, for example if the temperature drops, this is an indication that this container 6, 8, 10 has a leak, which can also be detected by the Joule-Thomson effect.

Usually, the temperature of a container 6, 8, 10 is to be always very close to the temperature of the other containers 6, 8, 10 after the fuel cell 4 is switched off if a leak can be ruled out. If this should not be the case for one of the containers 6, 8, 10, a fault in a temperature sensor 30, 32, 34 which is assigned to this container 6, 8, 10 is to be expected. In this respect, long-term observation of the temperatures can be provided.

Should the temperature in a container 6, 8, 10 which is not active and accordingly not opened drop without other temperature sensors 30, 32, 34 of further containers 6, 8, 10 which are not active and therefore closed also having such a reduction in the temperature and/or without the temperature of the air of the surroundings dropping, it is possible to conclude from this that this container 6, 8, 10 has a leak in a sealing area sealing off from the outside.

If a leak is detected in the way described above in one of the containers 6, 8, 10 and subsequently one of the other containers 6, 8, 10 is opened, wherein no leak is detected here, it is an indication that a leak as specified is present in the region of the container 6, 8, 10 but not in the entire fuel cell system 2, for example in a seal. In this way it is possible to quickly discover a possible fault, wherein an emergency running capability (limp home functionality) of the motor vehicle can also be taken into account. In this context, the motor vehicle is safely operated with reduced power, with the result that it can be driven home or to a workshop in such an operating mode.

By determining a missing, current-dependent quantity of hydrogen which is determined by the Faraday law or a characteristic curve for representing the quantity/current relationship, it is also possible to estimate, by comparison with a pressure-dependent quantity which is determined by the equation of the ideal gas by the Virial equation of the hydrogen and/or the characteristic curve for the quantity/pressure relationship, whether an unsafe state is present which requires immediate deactivation of the fuel cell system 2, or whether at least one workshop visit is necessary.

The invention has been described in detail with particular reference to preferred embodiments thereof and examples, but it will be understood that variations and modifications can be effected within the spirit and scope of the invention covered by the claims which may include the phrase "at least one of A, B and C" as an alternative expression that means one or more of A, B and C may be used, contrary to the holding in *Superguide* v. *DIRECTV*, 69 USPQ2d 1865 (Fed. Cir. 2004).

The invention claimed is:

1. A method for checking gas tightness of a fuel cell system which has a fuel cell and a container for storing hydrogen gas, the method comprising:
    using a pressure sensor on a line connecting the container to the fuel cell to measure a pressure of hydrogen gas flowing to the fuel cell in the line;
    calculating a quantity of hydrogen gas flowing to the fuel cell using a quantity/pressure relationship which describes a relationship between pressure and quantity of hydrogen gas;
    measuring a current generated by the fuel cell;
    calculating a quantity of hydrogen gas which has been converted into electricity by the fuel cell using a quantity/current relationship which describes a relationship between current generated by the fuel cell and quantity of burnt hydrogen gas;
    comparing the quantity of hydrogen gas flowing to the fuel cell with the quantity of hydrogen gas which has been converted into electricity;
    detecting a leak if the quantity of hydrogen gas flowing to the fuel cell is greater than the quantity of hydrogen gas which has been converted into electricity;
    measuring a temperature of the container to determine a temperature of hydrogen gas in the container;
    comparing the temperature of hydrogen gas with a temperature of surrounding air and determining a throughput rate of hydrogen gas for the container based on a Joule-Thomson effect;
    if the container is closed and the temperature of the container differs from the temperature of the surrounding air, detecting a leak in the container based on the Joule-Thomson effect; and
    controlling the fuel cell system to take remedial action in response to detecting the leak if the quantity of hydrogen gas flowing to the fuel cell is greater than the quantity of hydrogen gas which has been converted into electricity, or in response to detecting the leak in the container based on the Joule-Thomson effect if the container is closed and the temperature of the container differs from the temperature of the surrounding air.

2. The method as claimed in claim 1, wherein the ideal gas equation is used for the quantity/pressure relationship.

3. The method as claimed in claim 1, wherein a Virial equation for hydrogen gas is used for the quantity/pressure relationship.

4. The method as claimed in claim 1, wherein a characteristic curve relationship is used for the quantity/pressure relationship.

5. The method as claimed in claim 1, wherein Faraday's law is used for the quantity/current relationship.

6. The method as claimed in claim 1, wherein a characteristic curve relationship is used for the quantity/current relationship.

7. The method as claimed in claim 1, wherein
    for the pressure of hydrogen gas flowing to the fuel cell, a plurality of measured pressure values are summed to calculate the quantity of hydrogen gas flowing to the fuel cell, and
    current generated by the fuel cell, a plurality of measured current values are summed to calculate the quantity of hydrogen gas which has been converted into electricity.

8. The method as claimed in claim 1, wherein
    the fuel cell system has a plurality of containers for storing hydrogen gas,
    the plurality of containers are connected to the fuel cell via a common line on which the pressure sensor is arranged, and
    to check gas tightness, the pressure sensor measures the pressure of hydrogen gas flowing to the fuel cell while only one of the containers is opened and all other containers are closed.

9. The method as claimed in claim 1, further comprising:
    determining a quantity of air which flows to the fuel cell, and
    comparing the quantity of air which flows to the fuel cell with at least one of:
        the quantity of hydrogen gas flowing to the fuel cell, and
        the quantity of hydrogen gas which has been converted into electricity.

10. The method as claimed in claim 9, wherein
    determining the quantity of air which flows to the fuel cell comprises measuring a pressure of the air and calculating the quantity of the air which flows to the fuel cell from the pressure of the air using a quantity/pressure relationship.

11. The method as claimed in claim 1, wherein
    the fuel cell system has a plurality of containers for storing hydrogen gas,
    the temperature is measured for each of the plurality of containers, to determine a plurality of temperatures of hydrogen gas respectively in the plurality of containers, and
    the temperatures of hydrogen gas respectively in the plurality of containers are compared with one another.

12. The method as claimed in claim 1, wherein controlling the fuel cell system to take remedial action comprises performing internal checks to determine whether the pressure sensor is faulty.

13. The method as claimed in claim 1, wherein
    controlling the fuel cell system to take remedial action comprises deactivating the fuel cell system or operating the fuel cell system in an emergency mode.

14. The method as claimed in claim 1, wherein
    the fuel cell system is disposed in a motor vehicle, and
    controlling the fuel cell system to take remedial action comprises deactivating the fuel cell system.

15. The method as claimed in claim 1, wherein
    the fuel cell system is disposed in a motor vehicle, and
    controlling the fuel cell system to take remedial action comprises operating the fuel cell system in an emergency mode.

16. The method as claimed in claim 15, further comprising operating the motor vehicle with reduced power in response to detecting the leak if the quantity of hydrogen gas flowing to the fuel cell is greater than the quantity of hydrogen gas which has been converted into electricity, or in response to detecting the leak in the container based on the Joule-Thomson effect if the container is closed and the temperature of the container differs from the temperature of the surrounding air.

17. The method as claimed in claim 15, further comprising providing an indication motor vehicle service is needed in response to detecting the leak if the quantity of hydrogen gas flowing to the fuel cell is greater than the quantity of hydrogen gas which has been converted into electricity, or in response to detecting the leak in the container based on the Joule-Thomson effect if the container is closed and the temperature of the container differs from the temperature of the surrounding air.

18. A system to check gas tightness of a fuel cell system which has a fuel cell and a container for storing hydrogen gas, comprising:
- a pressure sensor to measure a pressure of hydrogen gas flowing to the fuel cell in a line connecting the container to the fuel cell;
- a current measuring device to measure a current generated by the fuel cell;
- a temperature sensor to measure a temperature of the container to determine a temperature of hydrogen gas in the container; and
- a control device to:
    - calculate a quantity of hydrogen gas flowing to the fuel cell based on the pressure measured, using a quantity/pressure relationship;
    - calculate a quantity of hydrogen gas burnt by the fuel cell based on the current measured, using a quantity/current relationship;
    - compare the quantity of hydrogen gas flowing to the fuel cell with the quantity of hydrogen gas burnt by the fuel cell;
    - detect a leak if the calculated quantity of the hydrogen gas flowing to the fuel cell is greater than the quantity of hydrogen gas burnt by the fuel cell;
    - compare the temperature of hydrogen gas in the container with a temperature of surrounding air and to determine a throughput rate of hydrogen gas for the container based on a Joule-Thomson effect;
    - if the container is closed and the temperature of the container differs from the temperature of surrounding air, identifying a potential leak in the container, based on the Joule-Thomson effect; and
    - control the fuel cell system to take remedial action in response to detecting the leak if the quantity of hydrogen gas flowing to the fuel cell is greater than the quantity of hydrogen gas which has been converted into electricity, or in response to detecting the leak in the container based on the Joule-Thomson effect if the container is closed and the temperature of the container differs from the temperature of the surrounding air.

* * * * *